US008583589B2

(12) United States Patent
Kolovski et al.

(10) Patent No.: US 8,583,589 B2
(45) Date of Patent: Nov. 12, 2013

(54) HYBRID APPROACH FOR EQUIVALENCE REASONING

(75) Inventors: Vladimir Kolovski, Nashua, NH (US);
Zhe Wu, Westford, MA (US); George Eadon, Hollis, NH (US)

(73) Assignee: Oracle International Corporation, Redwood Shores, CA (US)

(*) Notice: Subject to any disclaimer, the term of this patent is extended or adjusted under 35 U.S.C. 154(b) by 1072 days.

(21) Appl. No.: 12/573,899

(22) Filed: Oct. 6, 2009

(65) Prior Publication Data
US 2011/0082829 A1 Apr. 7, 2011

(51) Int. Cl.
*G06N 7/00* (2006.01)
(52) U.S. Cl.
USPC .................................. 706/55; 707/600
(58) Field of Classification Search
USPC .................................. 706/55; 707/600
See application file for complete search history.

(56) References Cited

U.S. PATENT DOCUMENTS

2006/0235823 A1 10/2006 Chong et al.
2008/0126399 A1* 5/2008 MacGregor .................... 707/102

OTHER PUBLICATIONS

"Syntactic clustering of the Web", A. Z. Broder, S. C. Glassman, M. S. Manasse, G. Zweig, Computer Networks and ISDN Systems, vol. 29, Issues 8-13, Sep. 1997, pp. 1157-1166.*
"Parallel Inferencing for OWL Knowledge Bases", Ramakrishna Soma, V. K. Prasanna, Parallel Processing, 2008. ICPP '08. 37th International Conference on, Sep. 9-12, 2008, pp. 75-82.*
"Design and implementation of an RDF triple store." Yeh, Ching-Long, and Ruei-Feng Lin. Proceedings of the First Workshop of Digital Archive Technology. 2002, 8 pages.*

"RStar: an RDF storage and query system for enterprise resource management", Li Ma, Zhong Su, Yue Pan, Li Zhang, Tao Liu, CIKM 2004, Proceedings of the thirteenth ACM international conference on Information and knowledge management, pp. 484-491.*
"OWLIM—A Pragmatic Semantic Repository for OWL", Atanas Kiryakov, Damyan Ognyanov, Dimitar Manov, Web Information System Engineerings—WISE 2005 Workshops, LNCS 3807, pp. 182-192.*
Agrawal, et al., Direct Algorithms for Computing the Transitive Closure of Database Relations, Proceedings of the 13th VLDB Conference, Brighton 1987, pp. 255-266.
Dong, et al., Maintaining Transitive Closure of Graphs in SQL, pp. 1-23, Intl. Journal of Information Technology, 5 (1): (1999).
Ioannidis, Yannis E., On the Computation of the Transitive Closure of Relational Operators, Proceedings of the Twelfth International Conference on Very Large Data Bases, Kyoto, Japan, Aug. 1986, pp. 403-411.
Pang, et al., Incremental Maintenance of Shortest Distance and Transitive Closure in First-Order Logic and SQL, ACM Transactions on Database Systems, vol. 30, No. 3, Sep. 2005, pp. 698-721.
Wu, et al., Implementing an Inference Engine for RDFS/OWL Constructs and User-Defined Rules in Oracle, pp. 1239-1248, 2008, IEEE 24th International Conference on Data Engineering, 2008.

* cited by examiner

*Primary Examiner* — Kakali Chaki
*Assistant Examiner* — Mai T Tran
(74) *Attorney, Agent, or Firm* — Kraguljac Law Group LLC (57) ABSTRACT

Systems, methods, and other embodiments associated with equivalence reasoning are described. One example method includes constructing a clique map that maps groups of equivalent resources to a representative canonical resource. The clique map is constructed by iteratively inputting batches of equivalence pairs from a semantic model to operating memory and building, in operating memory, one or more cliques for the input batch. Cliques for various input batches of equivalence pairs are merged in memory to produce the clique map for use by the semantic model. Triples associated with the semantic model may be consolidated by replacing resources that are in a clique with their corresponding representative canonical resource.

21 Claims, 5 Drawing Sheets

HYBRID APPROACH FOR EQUIVALENCE REASONING

BACKGROUND

The incremental evolution of the web to a semantic web is gaining momentum. Resource Description Framework (RDF) is being widely adopted as a standard to capture the semantics of data. Facts represented as RDF (subject, predicate, object) triples can capture both relationships between resources as well as attribute values associated with a resource. A unique challenge of semantic data stores is the ability to automatically derive additional facts based on facts already asserted in the semantic model. One common technique for deriving additional facts is equivalence reasoning, in which new triples are inferred based on a triple that asserts that two resources or properties are equivalent to one another. Example equivalence relations include the properties owl:sameAs, owl:equivalentProperty, and owl:equivalentClass are constructs in Web Ontology Language (OWL). When two resources are related to one another by an equivalence relation, they are members of an equivalence pair. For each triple that includes a resource from the equivalence pair, at least one inferred triple can be generated that replaces the asserted resource with its equivalent resource.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Equivalence relations are used extensively when merging data sets. For example, a first data set may have extensive data associated with a person identified as "John" and a second data set may have extensive data associated with the same person, identified as "Jack." In merging the datasets, the triple <John> owl:sameAs <Jack> may be inferred or explicitly asserted. During inference, all of the triples in the first data set that express facts about John may give rise to inferred triples that express facts about Jack while all of the triples in the second data set that express facts about Jack may give rise to inferred triples that express facts about John. In general, given a connected RDF graph with N resources using an owl:sameAs property, the number of inferred owl:sameAs triples will be on the order of $N^2$.

As part of the OWL 2 standardization effort, less expressive OWL subsets have been proposed that have polynomial complexity and are suitable for efficient and scalable reasoning over large datasets. One of these OWL subsets is OWL 2 RL, which is a rule-based profile of OWL 2. Since it is described as a collection of positive Datalog rules, OWL 2 RL can be theoretically implemented on top of semantic stores that already provide rule-based reasoning. One example technique to implementing an inference engine on such semantic stores is to pre-compute and materialize inferred triples using forward chaining, and later use the materialized view for query answering. The forward chaining approach repeatedly fires inference (or entailment) rules on the corpus of asserted and inferred triples in the materialized view until no new facts can be inferred. Other inference techniques apply inference rules at the time of query, which, while saving the time and memory used in generating inferred triples a priori, can significantly slow query response time. While the pre-computing and materializing of inferred triples will be discussed in the examples herein, it is to be understood that the methods and systems described herein may be applied to any inference technique that involves processing of equivalence relations.

One challenge to supporting enterprise-scale OWL 2 RL reasoning is handling equivalence relations. With the emergence of inter-connected Linked Data datasets, which use the owl:sameAs construct heavily, it becomes increasingly difficult to fully materialize owl:sameAs closures. The sameAs property, and other equivalence relations, have the following properties: reflexive, symmetric, and transitive. Because of these properties, during inference a full materialization of owl:sameAs related inferences could significantly increase the size of the inferred graph. Additionally, the owl:sameAs copy rule causes a copy of any triple that includes a resource that is part of an equivalence relation to be generated that replaces the resource with its equivalent resource. For example, given the following triple set:

```
<John> owl:sameAs <Jack>
<John> owl:sameAs <Johnny>
<Johnny> owl:hasAge "32"
```

A full materialization of the three triples would infer the following triples:

```
<Jack> owl:sameAs <John>
<Johnny> owl:sameAs <John>
<Jack> owl:sameAs <Johnny>
<Johnny> owl:sameAs <Jack>
<John> owl:sameAs <John>
<Jack> owl:sameAs <Jack>
<Johnny> owl:sameAs <Johnny>
<John> owl:hasAge "32"
<Jack> owl:hasAge "32"
```

In general, given a connected graph with N resources using only the owl:sameAs relationship, there will be up to N×N inferred owl:sameAs triples. Each group of owl:sameAs connected resources represents a clique. When doing full materialization, the cliques' sizes (in terms of owl:sameAs relationships) grow large. For instance, it takes more than 300 GB disk space to fully materialize the owl:SameAs closure for the UniProt dataset containing 80 million triples.

The hybrid approach to equivalence reasoning described herein avoids having to fully materialize cliques by choosing one resource from each clique as a representative and consolidating all inferences for that clique using the representative. Cliques are built iteratively from batches of triples in the materialized view that are transferred from remote access memory to operating memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software stored as computer executable instructions on a computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL (structured query language), an OQL (object query language), a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 1:
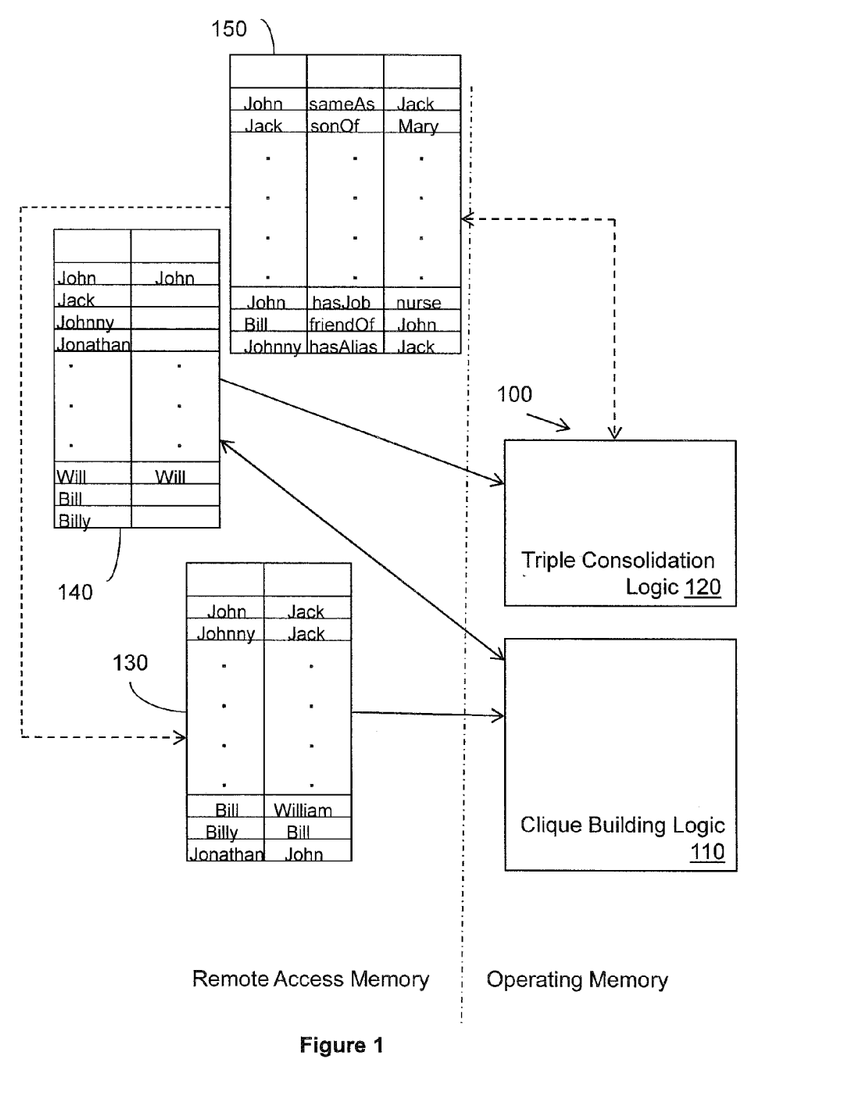
FIG. 1 illustrates an example embodiment of a system associated with a hybrid approach to equivalence reasoning.

FIG. 1 illustrates an example embodiment of an equivalence reasoning system 100 that is configured to perform a hybrid approach to equivalence reasoning that may avoid having to fully materialize all inferred triples that result from equivalence reasoning. The equivalence reasoning system 100 may be used with an inference engine to iteratively consolidate a materialized view 150 of asserted and inferred triples. The equivalence reasoning system includes a clique building logic 110 and a triple consolidation logic 120. As used herein, remote access memory includes any memory that is not part of operating memory, such as a disk or other remote data storage mechanism.

The clique building logic 110 inputs a list of equivalence pairs 130 and outputs a clique map 140. Equivalence pairs are properties or resources that have been deemed or inferred as equivalent according to a semantic model. Thus, the list 130 may be compiled or augmented by selecting from asserted triples that are asserted by a semantic mode any triples that include properties that express an equivalence relation between resources or properties. Alternatively, or additionally, the list 130 may be compiled or augmented by selected inferred triples that express an equivalence relation between resources or properties.

To build the clique map 140, the clique building logic 110 iteratively inputs, into operating memory, batches of one or more equivalence pairs from the equivalence relation list 130. The size of the batch may be selected based on the particular processing capabilities of the system 100. The clique building logic builds one or more cliques from the batch of equivalence relations by identifying and consolidating groups of equivalent resources into a clique and selecting a canonical representative resource for the clique. In the example shown in FIG. 1, in a first batch the equivalence pairs <John> and <Jack> and <Johnny> and <Jack> are input by the clique building logic 110. These two equivalence pairs may have been deduced from the materialized view 150 as triples <John> owl:sameAs <Jack> and <Johnny> owl:hasAlias <Jack> shown in the materialized view 150. In a subsequent batch, the clique building logic 110 will input the equivalence pair <Jonathan> and <John>.

The clique building logic 110 outputs, to remote access memory, the clique map 140 that maps the one or more cliques to a canonical representative resource. In the example shown in FIG. 1, the resource <John> has been selected as the canonical representative resource to represent the clique that includes <John>, <Jack>, <Johnny>. Once the equivalence pairs from the list 130 have been processed, the clique building logic may merge cliques in the clique map 140 that have been generated for different batches that pertain to the same resources. During this merging, the resource <Jonathan>, which was processed in a separate batch from <Jack> and <Johnny> would be merged into the clique map 140.

The clique map 140 may be used in consolidation of triples in any semantic data model that includes the same equivalence pairs that were input to the clique building logic 110. In the example embodiment illustrated in FIG. 1, the hybrid equivalence reasoning system includes the triple consolidation logic 120 that accesses the clique map to consolidate triples.

The triple consolidation logic 120 accesses the clique map 140 to consolidate the triples in the materialized view 150. To accomplish this consolidation, the triple consolidation logic 120 replaces triple resources in the materialized view 150 that are in a clique with their corresponding canonical representative resource. The triple consolidation logic 120 may then delete any duplicate triples that have been created by the replacement of triple resources with their canonical representative resources.

Figure 2:
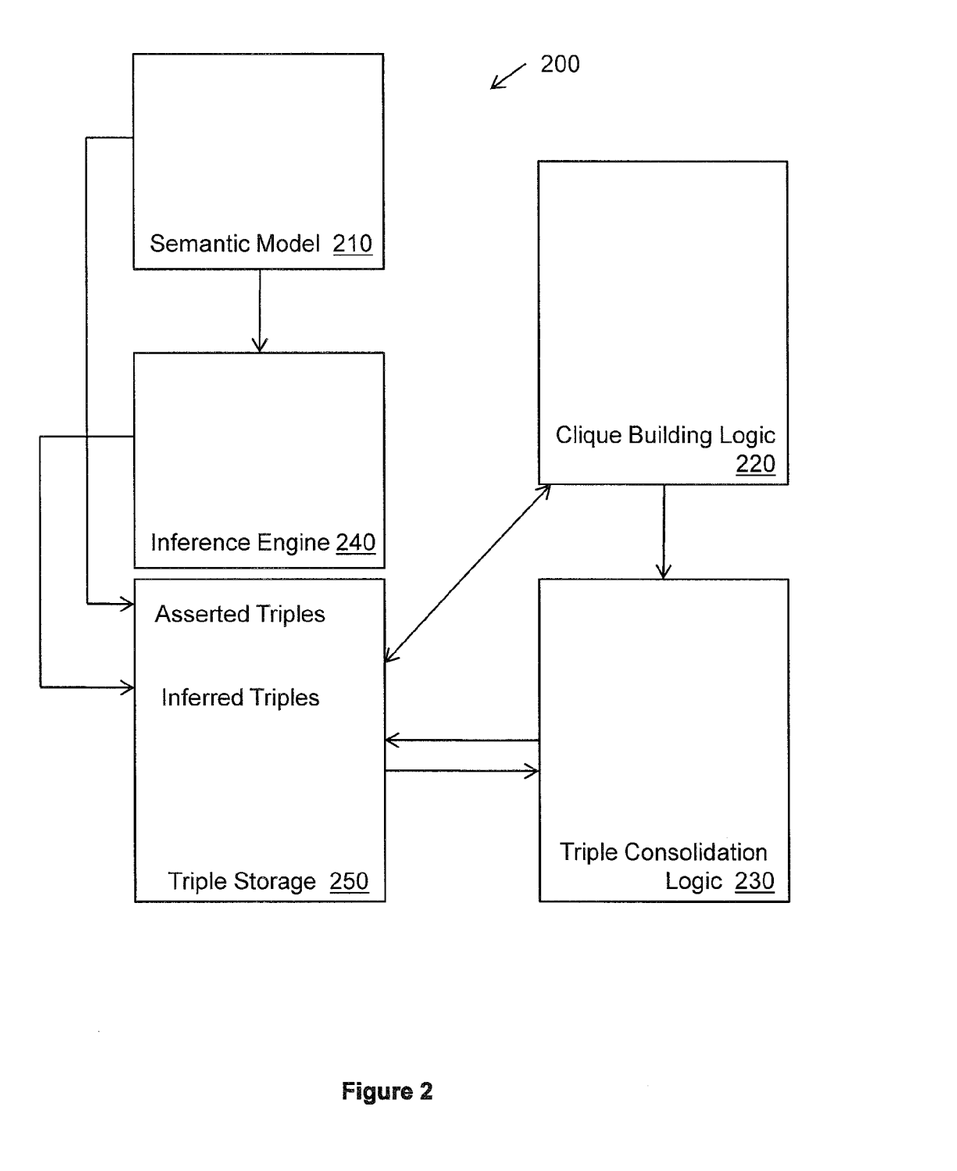
FIG. 2 illustrates another example embodiment of a system associated with a hybrid approach to equivalence reasoning.

FIG. 2 illustrates an example embodiment of an inference system 200 that includes a clique building logic 220 and a triple consolidation logic 230 that operate in a similar manner to the clique building logic 110 and triple consolidation logic 120 included in the hybrid equivalence reasoning system 100 outlined in FIG. 1. The inference system 200 periodically calls on the clique building logic 220 and the triple consolidation logic 230 to employ equivalence reasoning to consolidate triples stored in triple storage 250. The triple storage includes asserted triples that are asserted by a semantic model 210 and inferred triples that are generated during inference performed by an inference engine 240 acting on the asserted triples. In some example embodiments, the triple storage 250 is a partitioned temporary table in remote access memory.

The inference engine 240 generates inferred triples, some of which are equivalence pairs, based on one or more inference rules in the semantic model. The clique building logic 220 iteratively inputs, into operating memory, batches of one or more inferred equivalence pairs, and updates the clique map with one or more cliques that are determined from the inferred equivalence pairs. The triple consolidation logic accesses the updated clique map to consolidate asserted and inferred triples in triple storage 250 by replacing resources that are in a clique with their corresponding canonical representative resources.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
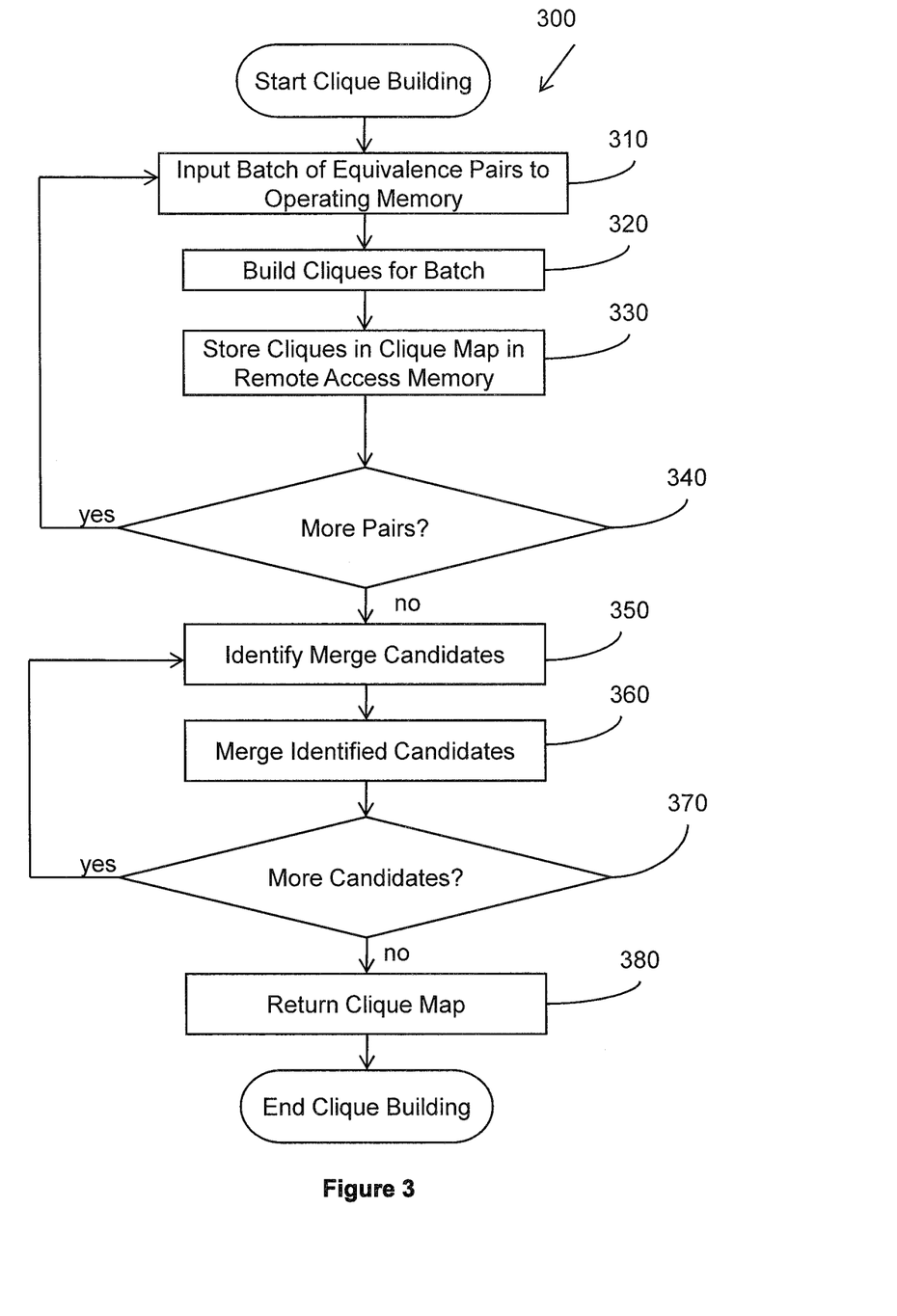
FIG. 3 illustrates an example embodiment of a method associated with a hybrid approach to equivalence reasoning.

FIG. 3 illustrates an example embodiment of a clique building method 300 that uses a hybrid approach to equivalence reasoning. At 310 a batch of equivalence pairs are input to operating memory. The equivalence pairs may be deduced from triples, asserted or inferred, that imply an equivalence relation, such as triples that include the property owl:sameAs. Other properties that imply an equivalence relation include owl:equivalentClass and owl:equivalentProperty. Of course, any number of properties could be created that would imply an equivalence relation. The equivalence pairs input at 310 may be pairs of resources or properties that are equivalent. At 320 cliques are built for the batch. The cliques may be built using a union-find algorithm that retrieves an input resource's canonical representative resource using a single look up. At 330 the cliques for the input batch are appended to a clique map in remote access memory.

At 340 if there are more equivalence pairs remaining, another batch of pairs is input at 310. If all pairs have been processed, the clique map may still have some equivalence relations as between the cliques found for the various batches. For example, if one clique contains <A> owl:sameAs <B> and another clique contains <B> owl:sameAs <C>, then <A> and <C> should be in the same clique. At 350 merge candidate cliques are identified among the cliques in the clique map. At 360 the identified candidates are merged in memory. This may be done using the union-find operation. The clique map is updated based on the merged candidates. The updating may be performed using an OUTER JOIN where each resource in the clique map is replaced by its clique representative from the in-memory clique map. At 370, when no more merge candidates remain, as determined by a stop criteria, the clique map is returned. In some examples, the stop criteria is when no further merges are possible. At 380 the clique map is returned for use in equivalence reasoning.

Figure 4:
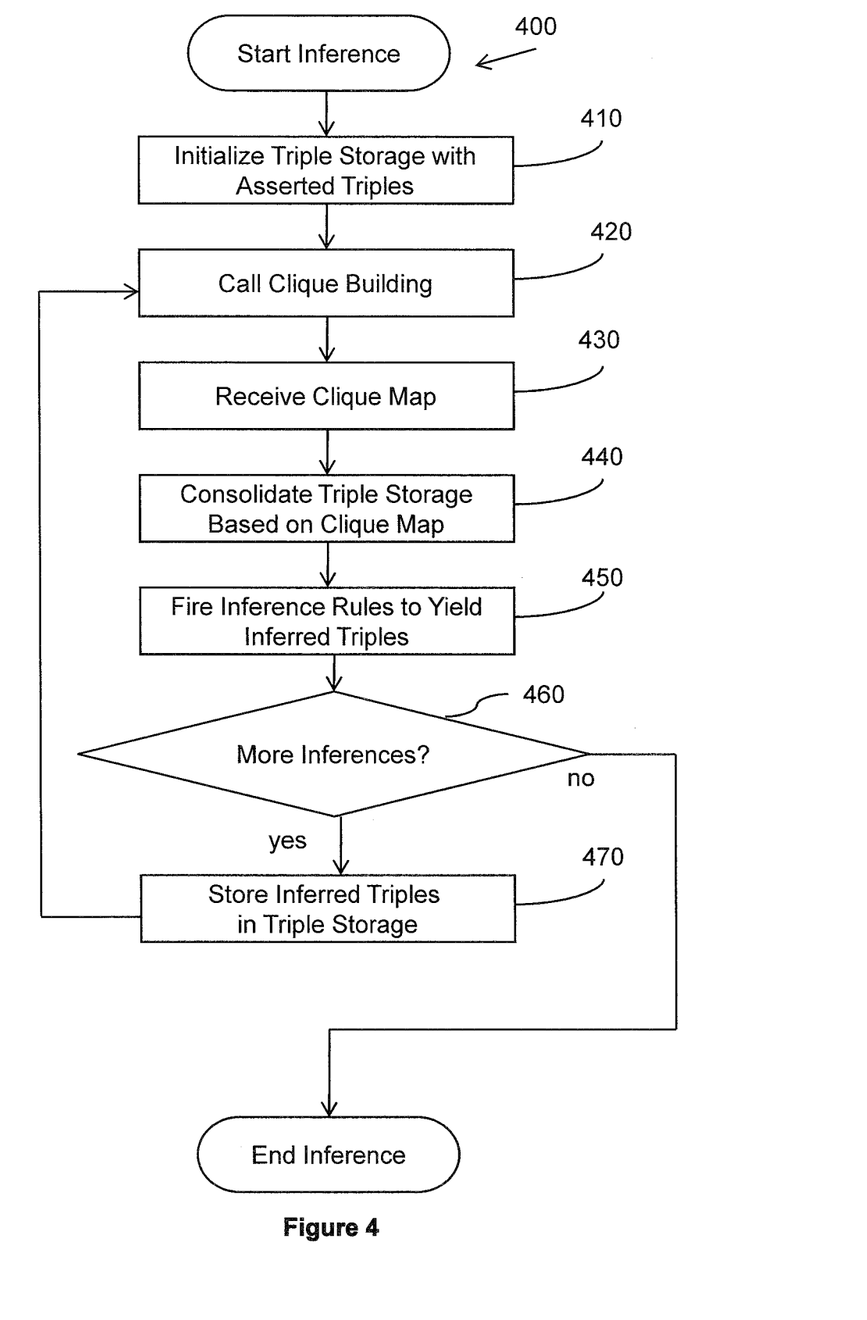
FIG. 4 illustrates another example embodiment of a method associated with a hybrid approach to equivalence reasoning.

FIG. 4 illustrates an example embodiment of an inference method 400 that employs a hybrid approach to equivalent reasoning. At 410 triple storage is initialized with triples asserted by a semantic model. At 420, a clique building procedure, such as the clique building method 300 described in FIG. 3, is called. The clique building procedure inputs equivalence pairs deduced from the triples in triple storage. A clique map is received at 430 and at 440 the triples triple storage are consolidated by replacing resources in a clique with their corresponding canonical representative.

At 450 the inference rules are fired to yield inferred triples. At 460 a determination is made as to whether any new inferences we made by firing by rules. If there are no new inferences, the inference method ends and the triple storage is returned. If there are new inferences, at 470 the inferred triples are stored in triple storage. At 420 clique building is called again to process batches of triples from triple storage as augmented by inferred triples to produce an updated clique map. The input to the clique builder is one or more equivalence pairs deduced from the newly inferred triples. Equivalence pairs that are generated during inference may be stored in a temporary table and input to clique building. At 430 and 440 triple storage is consolidated again based on the updated clique map. The consolidating of triple storage may be performed by hash partitioning the triple storage by a property of triples in triple storage and consolidating triple storage partition by partition. The method loops between 420 and 470 until no further inferences can be made, at which point, the triple storage represents a consolidated version of asserted and inferred triples that has been consolidated using equivalence reasoning.

While FIGS. 3 and 4 illustrate various actions occurring in serial, it is to be appreciated that various actions illustrated in FIGS. 3 and 4 could occur substantially in parallel. By way of illustration, a first process could build cliques, a second process could process inference rules, and a third process could consolidate triple storage. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes initializing a triple data store in operating memory with triples asserted by a semantic model; analyzing, in operating memory, batches of equivalence pairs from the asserted triples to update a clique map. The clique map is updated by building, in operating memory, one or more cliques for the input batch; appending the one or more cliques to a clique map in remote access memory; iteratively transferring a batch of merge candidate cliques from the clique map to operating memory; merging the input cliques in operating memory; and updating the clique map with the merged cliques. The clique map is stored in remote access memory for use by the semantic model. The triple data store is consolidated by replacing resources in triples that are in a clique with their corresponding canonical representative resource and deleting duplicate triples created by the replacement.

The method may also include firing inference rules associated with the semantic model to create one or more inferred triples; storing the inferred triples in the triple data store; identifying one or more inferred equivalence pairs from the inferred triples; updating the clique map based, at least in part on, the inferred equivalence pairs; and consolidating the triple data store by replacing resources in triples that are in a clique with the corresponding canonical representative resource and deleting duplicate triples created by the replacement.

While executable instructions associated with the above method are described as being stored on a computer-readable medium, it is to be appreciated that executable instructions associated with other example methods described herein may also be stored on a computer-readable medium.

Figure 5:
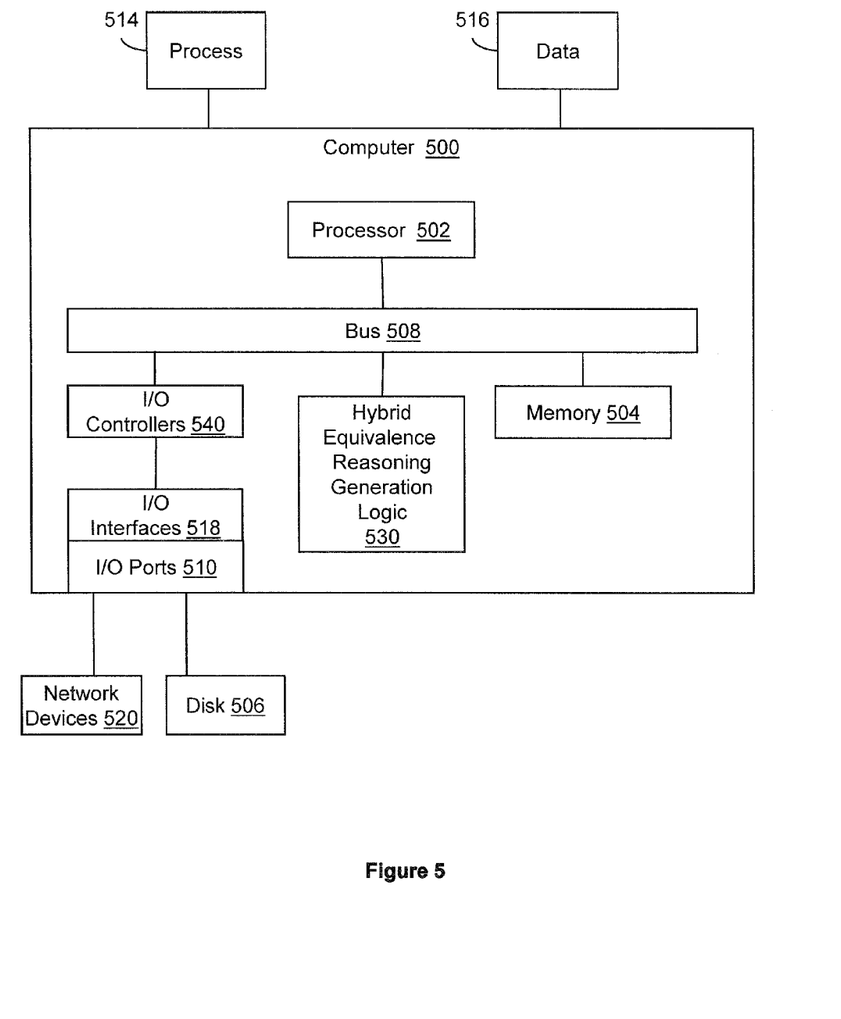
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a hybrid equivalence reasoning logic 530 configured to facilitate hybrid equivalence reasoning. In different examples, the logic 530 may be implemented in hardware, software stored as computer executable instructions on a computer-readable medium, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software stored as computer executable instructions on a computer-readable medium, firmware) for iteratively processing batches of equivalence pairs in operating memory to build one or more cliques to output a clique map that maps resources to an associated canonical representative resource and means (e.g., hardware, software stored as computer executable instructions on a computer-readable medium, firmware) for consolidating a triple table by replacing triple resources with their associated canonical representative resource and deleting duplicate triples created by the replacement.

The means may be implemented, for example, as an ASIC (application specific integrated circuit) programmed to apply a hybrid approach to equivalence reasoning. The means may also be implemented as computer executable instructions that are presented to computer 500 as data 516 that are temporarily stored in memory 504 and then executed by processor 502.

Logic 530 may also provide and means (e.g., hardware, software stored as computer executable instructions on a computer-readable medium, firmware) for generating inferred triples from inference rules in a semantic model and storing the inferred triples in the triple table, where the means for iteratively processing batches of equivalence pairs is configured to process inferred equivalence pairs that are deduced from the inferred triples to update the clique map and where the means for consolidating is configured to consolidate the triple table storing the inferred triples.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM (compact disk) drive, a CD-R (CD recordable) drive, a CD-RW (CD rewriteable) drive, a DVD (digital versatile disk and/or digital video disk) ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCI (peripheral component interconnect), PCIE (PCI express), 1394, USB (universal serial bus), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510.

Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN (local area network), a WAN (wide area network), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-implemented method, comprising:
   iteratively inputting batches of unprocessed equivalence pairs from a semantic model to an operating memory;
   building, in the operating memory, one or more cliques for the input batches until no further batches remain, where a clique designates a canonical representative resource for a group of equivalent resources as determined from the equivalence pairs;
   appending the one or more cliques built for the batches to a clique map in a remote access memory;
   iteratively transferring merge candidate cliques that still have equivalent resources for the input batches that can be merged from the clique map to the operating memory until determining no further merges can be made to the one or more cliques in the clique map;
   merging the merge candidate cliques in the operating memory;
   updating the clique map with the merged cliques; and
   returning the clique map for use by the semantic model.

2. The computer-implemented method of claim 1 where the building of the one or more cliques is performed using a union-find algorithm that inputs a resource and outputs the canonical representative resource for the resource.

3. The computer-implemented method of claim 1 where the merging is performed using a union-find algorithm that inputs a clique resource and outputs the canonical representative resource for the clique resource.

4. The computer-implemented method of claim 1 where the updating comprises performing an outer join between the input merge candidate cliques and the clique map.

5. The computer-implemented method of claim 1 comprising selecting the merge candidate cliques based on the presence of a common resource in more than one clique.

6. The computer-implemented method of claim comprising consolidating asserted triples in the semantic model based, at least in part, on the cliques in the clique map and storing the consolidated asserted triples in triple storage.

7. The computer-implemented method of claim 6 comprising:
   firing inference rules on the consolidated asserted triples to create inferred triples;
   appending the triple storage with the inferred triples
   deducing one or more inferred equivalence pairs from the inferred triples;
   building one or more cliques for the inferred equivalence pairs; and
   updating the clique map based, at least in part, on the one or more cliques built for the inferred equivalence pairs.

8. The computer-implemented method of claim 7 comprising consolidating the triple storage based, at least in part, on the updated clique map.

9. The computer-implemented method of claim 8 where the consolidating of the working table is performed by:
   hash partitioning the triple storage by a property of triples in the triple storage; and
   consolidating the triple storage partition by partition.

10. The computer-implemented method of claim 1 where the equivalence pairs comprise an OWL (web ontology language) sameAs property.

11. A computing system, comprising:
    a clique building logic that iteratively inputs, into an operating memory, batches of one or more equivalence pairs from a semantic model and outputs, to remote access memory, a clique map that maps groups of one or more equivalent resources, as determined from the equivalence pairs, to a canonical representative resource until no further merges can be made to the cliques in the clique map; and
    a triple consolidation logic that accesses the clique map to consolidate one or more triples that still have equivalent resources for the input batches that can be merged in the semantic model by replacing resources that are in a clique with their corresponding canonical representative resources.

12. The computing system of claim 11 where the triple consolidation logic deletes duplicate triples.

13. The computing system of claim 12 comprising a partitioned temporary table in remote access memory in which triples asserted in the semantic model and triples inferred using inference rules in the semantic model are stored by the inference engine.

14. The computing system of claim 12 further comprising:
    an inference engine that generates inferred equivalence pairs based on one or more inference rules in the semantic model and where the clique building logic iteratively inputs, into operating memory, batches of one or more inferred equivalence pairs, and updates the clique map with one or more cliques that consolidate groups of equivalent resources, as determined from the inferred equivalence pairs, to a canonical representative resource; and
    where the triple consolidation logic accesses the updated clique map to consolidate triples in the semantic model and inferred triples by replacing triple resources that are in a clique with their corresponding canonical representative resources.

15. The computing system of claim 14 where the inference engine stores an output of rules that infer an equivalence pair in a temporary table that is input to the clique building logic.

16. A non-transitory computer-readable medium storing computer executable instructions that when executed by a computer cause the computer to perform a method, the method comprising:

initializing a triple data store in a remote access memory with triples asserted by a semantic model;

analyzing, in a operating memory, batches of equivalence pairs deduced from the asserted triples to update a clique map by:

building, in the operating memory, one or more cliques for the input batches until no further batches remain, where a clique designates a canonical representative resource for a group of equivalent resources as determined from the equivalence pairs;

appending the one or more cliques to a clique map in the remote access memory;

iteratively transferring merge candidate cliques that still have equivalent resources for the input batches that can be merged from the clique map to the operating memory until no further merges can be made to the one or more cliques in the clique map;

merging the merge candidate cliques in the operating memory; and updating the clique map with the merged cliques; and storing the clique map in the remote access memory for use by the semantic model; and consolidating the triple data store by replacing resources in triples that are in a clique with the corresponding canonical representative resource and deleting duplicate triples created by the replacement.

17. The non-transitory computer-readable medium of claim 16 where the method includes:

firing inference rules associated with the semantic model to create one or more inferred triples;

storing the inferred triples in the triple data store;

identifying one or more inferred equivalence pairs from the inferred triples;

updating the clique map based, at least in part on, the inferred equivalence pairs; and consolidating the triple data store by replacing resources in triples that are in a clique with the corresponding canonical representative resource and deleting duplicate triples created by the replacement.

18. The non-transitory computer-readable medium of claim 16 where the building of one or more cliques is performed using a union-find algorithm that inputs a resource and outputs the canonical representative resource for the resource.

19. The non-transitory computer-readable medium of claim 16 where the merging is performed using a union-find algorithm that inputs a clique resource and outputs the canonical representative resource for the clique resource.

20. The non-transitory computer-readable medium of claim 16 where the merging comprises inputting the merge candidate cliques into the operating memory and the updating comprises performing an outer join between the input merge candidate cliques and the clique map.

21. The non-transitory computer-readable medium of claim 16 where the method comprises selecting the merge candidate cliques based on the presence of a common resource in more than one clique.

* * * * *

UNITED STATES PATENT AND TRADEMARK OFFICE
CERTIFICATE OF CORRECTION

PATENT NO. : 8,583,589 B2
APPLICATION NO. : 12/573899
DATED : November 12, 2013
INVENTOR(S) : Kolovski et al.

It is certified that error appears in the above-identified patent and that said Letters Patent is hereby corrected as shown below:

In the Specification

In column 3, line 67, delete "(e.g.," and insert -- e.g., --, therefor.

In column 7, line 51-52, delete "at least in part on," and insert -- at least in part, on --, therefor.

In the Claims

In column 10, line 7, in Claim 6, delete "claim" and insert -- claim 1 --, therefor.

In column 10, line 56, in Claim 14, delete "claim 12" and insert -- claim 11 --, therefor.

In column 12, line 10, in Claim 17, delete "at least in part on," and insert -- at least in part, on --, therefor.

Signed and Sealed this
Third Day of June, 2014

Michelle K. Lee
*Deputy Director of the United States Patent and Trademark Office*